(No Model.)
F. F. SNOW.
VAPORIZING CARBURETER AND AIR GOVERNOR FOR GAS ENGINES.
No. 593,911. Patented Nov. 16, 1897.
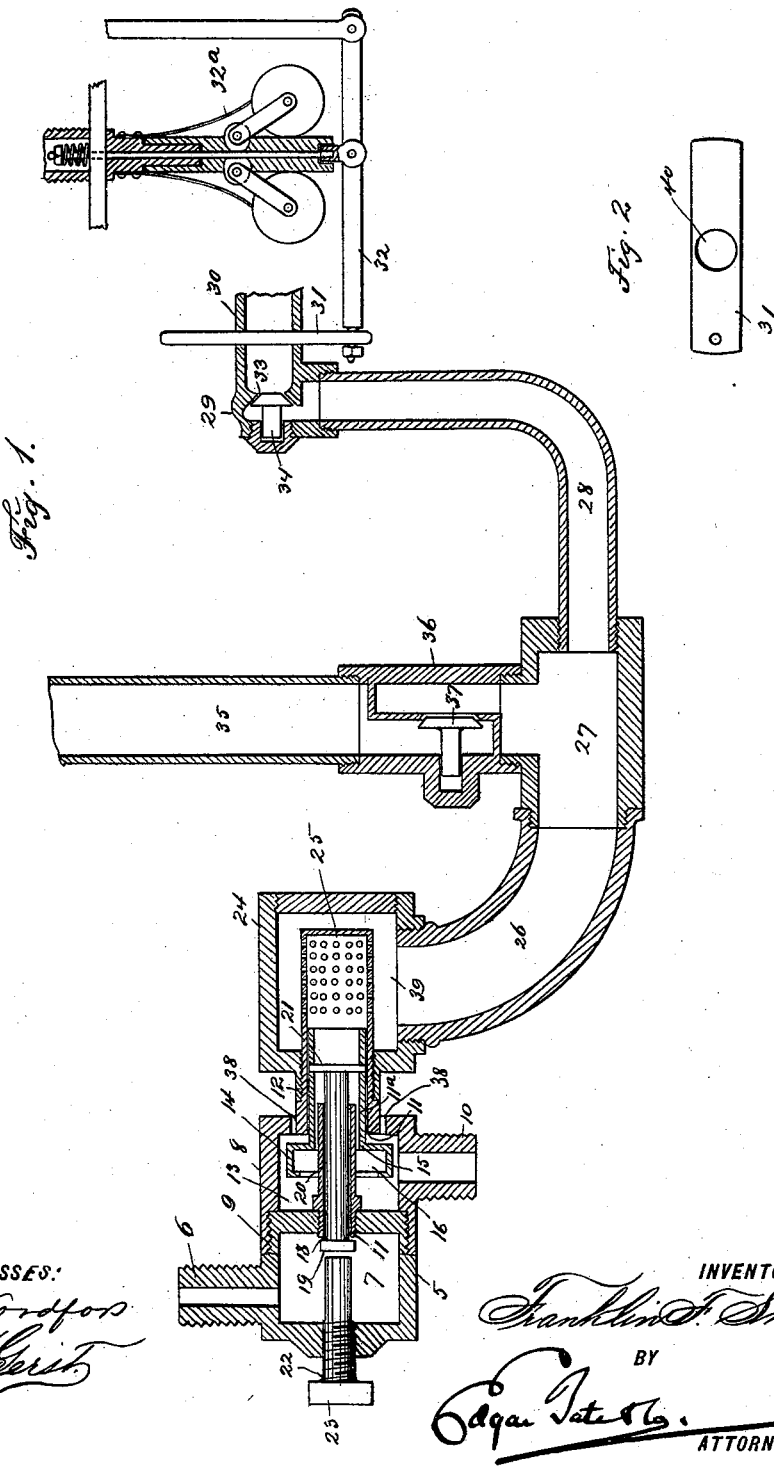

UNITED STATES PATENT OFFICE.

FRANKLIN FRANCIS SNOW, OF BENTON HARBOR, MICHIGAN.

VAPORIZING-CARBURETER AND AIR-GOVERNOR FOR GAS-ENGINES.

SPECIFICATION forming part of Letters Patent No. 593,911, dated November 16, 1897.

Application filed November 7, 1896. Serial No. 611,362. (No model.)

*To all whom it may concern:*

Be it known that I, FRANKLIN FRANCIS SNOW, a citizen of the United States, residing at Benton Harbor, in the county of Berrien and State of Michigan, have invented certain new and useful Improvements in Vaporizing-Carbureters and Air-Governors for Gas-Engines, of which the following is a full and complete specification, such as will enable those skilled in the art to which it appertains to make and use the same.

This invention relates to vaporizing-carbureters and air-governors for gas-engines; and the object thereof is to provide an improved device of this class which is simple in construction and operation; and with this and other objects in view the invention consists in the construction, combination, and arrangement of parts hereinafter described and claimed.

The invention is fully disclosed in the following specification, of which the accompanying drawings form a part, the separate parts of my improvement being designated by the same numerals of reference.

Figure 1 is a central longitudinal section of my improved apparatus, and Fig. 2 a view of a detail of construction.

In the practice of my invention I provide a main cylindrical casing 5, which is provided at its outer end with a screw-threaded tubular extension 6, which is adapted to serve as a connection with a tube leading to a suitable gasolene-tank, and within said casing 5 is the gasolene-chamber 7.

Connected with the inner end of the casing 5 is a small cylindrical supplemental casing 8, said casings being connected by a screw-thread, as shown at 9, and the casing 8 is provided on one side thereof with a tubular screw-threaded extension 10, by means of which connection is made with a suitable gas-supply.

The outer end of the casing 8 is provided with a central circular opening 11, around which is formed a tubular screw-threaded extension 12, and mounted in the gas-chamber 13, within the chamber 8, is a hollow circular valve 14, which is provided centrally of its outer side with a tubular extension 15, which passes through the opening in the outer end of the side of the casing 8 and is free to move therein.

The valve 14 is provided with an annular chamber 16, which opens in the gas-chamber 13, and mounted in the inner end of the casing 5 is a tube 17, which extends through the chamber 13 and the casing 8 and part way through the outwardly-directed tubular extension 15 of the valve 14, having a small annular space 11ª between the said tube and extension, and the inner end of the tube 17 projects into the gasolene-chamber 7 and is provided with an annular valve-seat 18, and I also provide a valve 19, which is provided with a valve-stem 20, which passes through the tube 17 and which is provided at its inner end with a cross head or rod 21, which is connected with the tubular extension 15 of the valve 14 in such manner that both valves are operated at the same time, and passing through the outer end of the casing 5 is a screw-threaded bolt 22, provided with a head 23, and by means of which the movement of the valve 19 may be regulated.

Connected with the tubular extension 12 of the casing 8 is a cylindrical auxiliary casing 24, into which the tubular extension 12 projects, and which forms the vaporizing-chamber, and mounted or formed thereon is a perforated tubular casing 25, into which the tubular extension 15 of the valve 14 projects, and connected with one side of the casing 24 is a curved tube 26, which connects with a coupling-head 27, which is provided at its outer end with a curved tube 28, which connects with an elbow coupling-head 29, which is provided at one side with an extension 30, through which passes a sliding valve 31, with which is connected an operating-lever 32, which is connected with the governor of the engine 32ª and operated in the usual manner, and within the coupling-head 29 is a valve-seat 33, which is controlled by a valve 34, these parts being of the usual form. The coupling-head 27 is also provided with the usual suction-pipe 35, which connects with the engine, and said pipe 35 is connected with the coupling-head 27 by a tubular coupler 36, in which is placed a valve 37, these parts being also of the usual construction.

Within the end of the casing 8, around the tubular extension 12, is formed a plurality of ports or passages 38, which are designed for the admission of air, and these ports or passages are controlled by the valve 14, and the chamber 39 within the casing 24 constitutes the vaporizing-chamber, as usual in this class of devices.

It will be understood that the couplers at 6 and 10, by means of which connection is made with the gasolene and gas supply, are provided with valves in the usual manner, and in the operation of the device the gasolene enters the chamber 7 and passes through the tube 17 into the perforated mixing-tube 25 with great force and is reduced into a vapor, and air enters the chamber 13 and passes through the valve 14 and the tubular extension 15 thereof into said perforated tube 25 and is mingled therein with the gasolene.

The valves 14 and 19 open by the exhaustion of the air from the chamber 13 by the operation of the engine, this operation causing a vacuum in said chamber, and this operation raises the valve 14 and admits air through the ports or passages 38, and when the valve 14 opens, as described, the valve 19 is also opened by the cross-head 21, the movement of both valves being controlled by the screw-bolt 22, and this operation is repeated with every pulsation of the engine.

The gasolene and air are mingled in the perforated tube 25, which constitutes the mixing-chamber, and together they pass to the engine through the tube 35 in the usual manner, and the amount supplied to the engine will be controlled by the sliding valve 31, which is regulated by the speed of the engine.

It will be understood that the gasolene, gas, and air may be used together, or either the gasolene or gas may be used in connection with the air; and it will also be understood that when either the gas or gasolene is used separately the pipe by which the other is admitted is closed, and the operation of the device is exactly the same in either event, the operation of the valves 14 and 19 being always the same.

The governing of the engine is accomplished by the sliding valve 31, which is provided with an opening 40, which corresponds with that in the pipe 30, and this valve is connected with the governor in the usual manner.

The tube 28 is intended to supply air for the purpose of diluting the mixture and checking the action of the valves 14 and 19. The air which enters through the ports 30 and opening 40 in the slide-valve 31 passes through the tube 28 to the coupling-head 27 and relieves the pressure on the valves 14 and 19 and thereby reduces the action, and when the speed of the engine reaches the normal again the flow of air is stopped in the tube 28 and the operation of the valve is restored. Thus the operation of the apparatus is automatic, as will be readily understood.

Having fully described my invention, I claim as new and desire to secure by Letters Patent—

1. In a vaporizing-carbureter and air-governor for gas-engines, the combination of a main casing, with means for admitting gasolene thereto, said casing being provided at its outer end with a screw-threaded bolt which passes therethrough, and at its inner end with a central tube, a supplemental casing connected with said main casing through which said tube passes, a valve mounted in said main casing, and provided with a stem, which passes through said tube, said valve being adapted to close the passage through said tube, said supplemental casing being also provided centrally of its outer end with a tubular extension with which is connected an auxiliary casing, within which is mounted a perforated tube, which is connected with said tubular extension, and a cylindrical hollow valve mounted in said supplemental casing and provided with a tubular extension, which passes through the tubular extension of the supplemental casing into the perforated tube in the auxiliary casing, and the inner end of the valve-stem of the valve within the main casing being provided with a cross head or rod which is connected with the tubular extension of the valve within the supplemental casing, substantially as shown and described.

2. In a vaporizing-carbureter and air-governor for gas-engines, the combination of a main casing with means for admitting gasolene thereto, said casing being provided at its outer end with a screw-threaded bolt which passes therethrough, and at its inner end with a central tube, a supplemental casing connected with said main casing through which said tube passes, a valve mounted in said main casing and provided with a stem, which passes through said tube, said valve being adapted to close the passage through said tube, said supplemental casing being also provided centrally of its outer end with a tubular extension with which is connected an auxiliary casing within which is mounted a perforated tube, which is connected with said tubular extension, and a cylindrical hollow valve mounted in said supplemental casing and provided with a tubular extension, which passes through the tubular extension of the supplemental casing into the perforated tube in the auxiliary casing, and the inner end of the valve-stem of the valve within the main casing being provided with a cross head or rod which is connected with the tubular extension of the valve within the supplemental casing, and said supplemental casing being provided with air ports or passages which are controlled by the valve mounted therein, substantially as shown and described.

3. In a vaporizing-carbureter and air-governor for gas-engines, the combination with a casing as 5, provided with a screw-threaded bolt 22, in one end thereof, and at the other with a central tube as 17, of a supplemental casing as 8, connected therewith, and provided with a tubular extension as 12, an auxiliary casing as 24, mounted on said tubular extension and provided with a perforated tube which communicates therewith, the casing 5, being provided with a valve as 19, which closes the passage through the tube 17, and with a valve-stem which passes therethrough, and the casing 8, being provided with a hollow cylindrical valve as 14, which is provided with a tubular extension which incloses the tube 17, and which communicates with the perforated tube in the casing 24, and the end of said valve-stem and the tubular extension of the valve 14, being connected, and said supplemental casing being provided with air ports or passages which are controlled by the valve 14, mounted therein, substantially as shown and described.

4. In a vaporizing-carbureter and air-governor for gas-engines, the combination of three separate casings connected in line as described, means for admitting gasolene to the outer casing, means for admitting gas and air to the central casing, and valves located in each which are operatively connected, said central casing being also in communication with the inner casing which is provided with a perforated tube which is in communication with said outer and central casings, said central casing being also provided with air ports or passages which are controlled by the valve located therein, substantially as shown and described.

5. In a vaporizing-carbureter and air-governor for gas-engines, the combination of three separate casings connected in line as described, means for admitting gasolene to the outer casing, means for admitting gas and air to the central casing, and valves located in each which are operatively connected, said central casing being also in communication with the inner casing which is provided with a perforated tube, which is in communication with said outer and central casings, said central casing being also provided with air ports or passages which are controlled by the valve located therein, and said inner casing being also in communication with the engine, this connection being made in the usual manner, substantially as shown and described.

In testimony that I claim the foregoing as my invention I have signed my name, in presence of the subscribing witnesses, this 31st day of October, 1896.

FRANKLIN FRANCIS SNOW.

Witnesses:
CHARLES N. SEARS,
WILLIAM SMITH.